Figure 1:
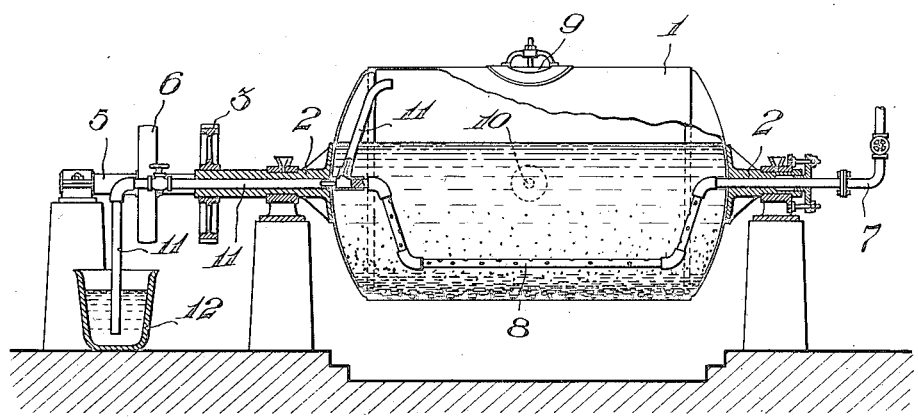

R. TAKI.
METHOD FOR THE MANUFACTURE OF LIME SULPHUR.
APPLICATION FILED JAN. 26, 1920.

Patented Oct. 31, 1922.

Witnesses.

Inventor.
Rokujiro Taki ic
UNITED STATES PATENT OFFICE.

ROKUJIRO TAKI, OF SHIZUOKA-KEN, JAPAN.

METHOD FOR THE MANUFACTURE OF LIME SULPHUR.

Application filed January 26, 1920. Serial No. 353,997.

*To all whom it may concern:*

Be it known that I, ROKUJIRO TAKI, a subject of the Emperor of Japan, residing at Abe-Gun, Shizuoka-Ken, Japan, have invented certain new and useful invention of a Method for the Manufacture of Lime Sulphur, of which the following is a specification.

This invention relates to an improved method for the economical, efficient and quick production of lime sulphur. In the method calcium oxide and sulphur in excess are mixed with water in a pressure-proof revolving tank, into which steam, under proper pressure and at a proper temperature (above the melting point of sulphur), is introduced to heat the mixed solution under pressure. The contents of the tank is agitated and chemically combined by the rotation of the tank and the heat treatment, and when the mixture is cooled, the excess quantity of pure sulphur will occupy the bottom of the tank, the liquid lime sulphur will occupy a position at the top of the mixture, and the mud-like intermixture contained in sulphur ore, calcium oxide and other insoluble substances will lie between.

The accompanying drawings show an example of an apparatus by which the method may be practiced. In the drawing:—

Figure 2:
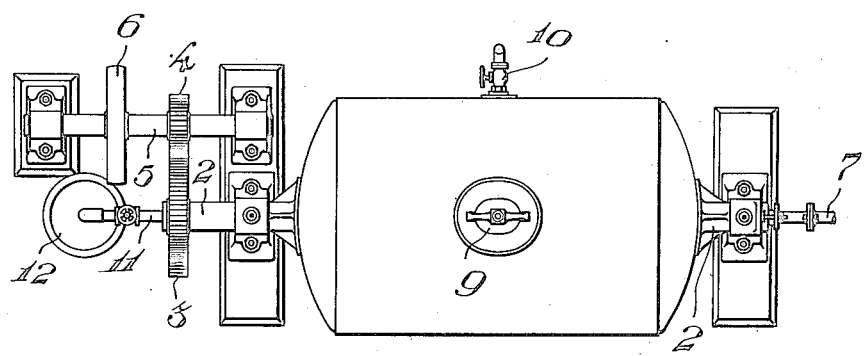

Figure 1 is a vertical longitudinal section, and Figure 2 is a plan view of the apparatus.

In carrying out the improved method, calcium oxide and sulphur, the latter in some proper excess proportion or greater than its equivalent quantity with regard to the former, are mixed with water in a pressure-proof revolving tank, and steam under proper pressure and at a temperature above the melting point of sulphur is introduced into the tank to heat and agitate the mixed solution and to cause it to be chemically combined. The reaction will be accelerated by the rotation of the tank. After a suitable period of time, the rotation of the tank is discontinued and the tank with its contents is cooled for a suitable period of time to allow the excess sulphur and the mud and other insoluble substances to be deposited in the bottom portion of the tank. Finally the solution of the lime sulphur lying at the top of the mixture and produced by the above process is taken off, then the mud-like deposits are removed, and finally the sulphur can be taken out, or left in the tank, without any waste, to provide for a subsequent similar process.

Referring to the accompanying drawing a horizontally disposed pressure-proof tank is shown having its end walls provided with trunnions 2 which are rotatably mounted in suitable bearings. One of the trunnions is provided with a fixed gear 3 which meshes with a gear 4 fixed to a shaft 5 having a pulley 6 which may be driven from any suitable prime mover. A steam supply pipe 7 extends through one of the trunnions 2 and its portion which is arranged within the tank 1 is of substantially U-shape as shown at 8 while the extremity of the steam-pipe is closed and swiveled in the inner end of a pipe 11 which extends through the other trunnion 2. The pipes 7 and 11 are normally stationary but the pipe with its U-shaped portion 8 may be turned to cause the U-shaped portion of the pipe to assume a position diametrically opposite to that shown in Fig. 1 of the drawing. This is to prevent the sulphur and other deposits from closing the openings in the U-shaped portion at the cooling stage. The tank is provided with an opening closed by a cover 9, and a cock 10 is arranged at one side of the tank. The inner end of the pipe 11 is branched as shown and this branch extends upwardly and has its end arranged near the upper portion of the tank for the purpose of discharging gases generated within the tank. These gases are carried by the pipe 11 and discharged beneath the surface of a body of caustic soda arranged within a subsidiary tank 12.

In practicing the process with the apparatus described, the solution is preferably mixed in the proportion of 1 lb. of calcium oxide to 2 lbs. of sulphur and 9 lbs. of water (in case sulphur-ore, sulphury soil, or the like is used instead of pure sulphur, such quantity of this ore or soil as would contain 2 lbs. of pure sulphur is employed in lieu of pure sulphur), and is put in the tank to fill about 70% of its depth, as shown in Fig.

1. The cover 9 and a valve in the pipe 11 is then closed, and then the tank is rotated while steam under a pressure of approximately 25 lbs. is introduced into the tank. The contents of the tank is thus heated under pressure, by steam and by the heat evolved by the combination of the calcium oxide, the pressure in the tank being maintained at a proper degree by the adjustment of the valve in the pipe 11. The gas evolved in the tank 1 will pass off through the pipe 11 into the caustic soda contained in the tank 12. The sulphureted hydrogen produced during the above process and discharged through the exhaust pipe 11 will be led into the caustic soda tank to secure sodium sulphide as a by-product. Thus sodium sulphide is economically produced and the passage of the sulphureted hydrogen into the caustic soda absorbs the offensive odor generated within the tank 1.

The contents of the tank 1 is continuously agitated by the steam jets issuing from perforations in the U-shaped portion 8 of the steam pipe and as the tank revolves the portion 8 of the steam pipe will act as a dasher against which the mixture is thrown. The operation above mentioned is maintained for a proper length of time and chemical action is caused between the calcium oxide and the sulphur and a thick liquid lime sulphur is produced.

When the above chemical action is nearly completed, the steam is cut off, the rotation of the tank is discontinued, and the tank and its contents are permitted to cool for a proper length of time, until the excess portion of sulphur melted during the heating, deposits in solid form upon the bottom of the tank. The lime soil, mud, and other insoluble substances settle solidly in stratified relation above the excess portion of sulphur melted during the heating. When the sulphur becomes completely solidified, the discharge valve 10 is opened, and the lime sulphur solution is first removed, and then the mud-like deposits, as well as the sulphur deposits are taken out. If desired the latter may be left in the tank to be employed in the next operation. In the above operation, if the rotation of the tank is further continued to stir up the contents for a time after the steam has been cut off and the contents of the tank are cooled below the melting point of sulphur, the excess of sulphur will be transformed from its fused state into a solid state of fine powder while being cooled, and this facilitates its removal from the mud and the like.

In the manufacture of lime sulphur, the quantity of both calcium oxide and sulphur taken for the mixture must always be in a certain fixed proportion. As the commercial calcium oxide and sulphur widely differ as to their purity and other natures, it is very difficult to mix them up in an accurately equivalent proportion for the production of producing lime sulphur, and some excess quantity of either calcium oxide or sulphur is inevitably found among the deposits after the completion of reaction. Such excess calcium oxide or sulphur being quite intermingled with mud and other insoluble substances after reaction, is not suited for subsequent use and before the present invention was wastefully thrown away. In the present process, however, sulphur being mixed in some excess proportion acts upon the entire quantity of calcium oxide under high temperature, and the excess sulphur being separately deposited from other deposits, is suited for repeated use. According to the process, therefore, both calcium oxide and sulphur are wastelessly used up, and lime sulphur may be produced much more economically, and at the same time the difficulties in obtaining the mixing proportions are entirely avoided.

Besides in the present process, as the mixture is heated in a high temperature above the melting point of sulphur, the sulphur acts on the calcium oxide in the fused state and the reaction is accelerated, the thickness of solution may be increased and the time for the completion of reaction is remarkably shortened. Further as the sulphur melts in the heating and agitating stage, sulphur ore, sulphury soil or any other sulphur containing material may be effectively used as they are, in place of finely powdered pure sulphur used in the known process, and on this point the production of lime sulphur is further economized, and rendered more easy and safe, according to the present invention.

What I claim and desire to secure by Letters-Patent is:

1. A process for producing lime sulphur in which calcium oxide and an excess of sulphur, and water, are mixed in a pressure-proof revolving chamber, and steam under a pressure of approximately 25 lbs. is introduced into said chamber to heat the mixture above the melting point of sulphur, and after the reaction is completed the contents of the chamber are cooled and the excess sulphur is deposited on the bottom of the chamber free from other deposits in a stratified state, substantially as described.

2. A process for producing lime sulphur consisting in mixing sulphur and calcium oxide, the former in excess, with water in a pressure-proof revolving chamber admitting steam under a pressure of approximately 25 lbs. directly into the mixture to maintain the temperature of said mixture above the melting point of sulphur, passing the gas generated from the mixture into caustic soda for producing sodium sulphide, shutting off the steam from said chamber and discontinuing the revolution of the chamber, after the reaction in the chamber is completed and until the mixture is cooled below the melting point of sulphur and the excess sulphur is deposited on the bottom of the tank in a fine powdered state below the other mud-like deposits substantially as described.

In testimony whereof I have affixed my signature in presence of two witnesses.

ROKUJIRO TAKI.

Witnesses:
  KWAN ICHI RAWA,
  EISHIRO ABES.